(12) United States Patent
Prabhakaran et al.

(10) Patent No.: US 7,849,354 B2
(45) Date of Patent: Dec. 7, 2010

(54) GRACEFULLY DEGRADABLE VERSIONED STORAGE SYSTEMS

(75) Inventors: Vijayan Prabhakaran, Sunnyvale, CA (US); Venugopalan Ramasubramanian, Mountain View, CA (US); Lidong Zhou, Sunnyvale, CA (US); Roy Levin, Palo Alto, CA (US); Chandramohan A. Thekkath, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 768 days.

(21) Appl. No.: 11/811,780

(22) Filed: Jun. 12, 2007

(65) Prior Publication Data

US 2008/0313496 A1 Dec. 18, 2008

(51) Int. Cl.
*G06F 11/00* (2006.01)

(52) U.S. Cl. .............................. 714/6; 714/15; 707/695; 717/170

(58) Field of Classification Search ...................... 714/6, 714/15; 707/695; 717/170
See application file for complete search history.

(56) References Cited

U.S. PATENT DOCUMENTS

| | | | | |
|---|---|---|---|---|
| 5,787,262 A * | 7/1998 | Shakib et al. | ............... | 709/205 |
| 5,806,078 A * | 9/1998 | Hug et al. | ............... | 715/205 |
| 5,986,709 A * | 11/1999 | Lee | ............... | 375/240.2 |
| 6,161,198 A * | 12/2000 | Hill et al. | ............... | 714/15 |
| 6,175,917 B1 * | 1/2001 | Arrow et al. | ............... | 713/1 |
| 6,269,431 B1 | 7/2001 | Dunham | | |
| 6,343,320 B1 * | 1/2002 | Fairchild et al. | ............... | 709/224 |
| 6,581,157 B1 * | 6/2003 | Chiles et al. | ............... | 713/1 |
| 6,772,364 B1 * | 8/2004 | Pinter et al. | ............... | 714/5 |
| 6,892,320 B1 * | 5/2005 | Roush | ............... | 714/15 |
| 6,985,996 B1 * | 1/2006 | Nagshain | ............... | 711/114 |
| 7,085,768 B2 | 8/2006 | Scott et al. | | |
| 7,146,476 B2 | 12/2006 | Sandorfi et al. | | |
| 7,318,151 B1 * | 1/2008 | Harris | ............... | 713/2 |
| 7,496,555 B2 * | 2/2009 | Margolus | ............... | 1/1 |
| 7,579,942 B2 * | 8/2009 | Kalik | ............... | 340/435 |
| 7,650,533 B1 * | 1/2010 | Saxena et al. | ............... | 714/6 |
| 2002/0194529 A1 * | 12/2002 | Doucette et al. | ............... | 714/6 |
| 2003/0033328 A1 * | 2/2003 | Cha et al. | ............... | 707/204 |
| 2004/0093361 A1 | 5/2004 | Therrien et al. | | |
| 2004/0167943 A1 | 8/2004 | Margolus | | |
| 2005/0086384 A1 | 4/2005 | Ernst | | |
| 2005/0283645 A1 | 12/2005 | Turner et al. | | |
| 2006/0064486 A1 * | 3/2006 | Baron et al. | ............... | 709/224 |
| 2006/0253734 A1 * | 11/2006 | Oka | ............... | 714/6 |
| 2007/0033354 A1 | 2/2007 | Burrows et al. | | |

OTHER PUBLICATIONS

Lee, et al., "Petal: Distributed Virtual Disks", Proceedings of the seventh international conference on Architectural support for programming languages and operating systems, Date: 1996, pp. 84-92, ACM Press, New York, USA.

(Continued)

*Primary Examiner*—Joshua Lohn
*Assistant Examiner*—Loan L. T. Truong

(57) ABSTRACT

Multiple versions of data on different sets of machines allow a system to degrade gracefully even when experiencing excessive failures. When excessive failures cause the latest versions to be unavailable, the system becomes degraded, but still offers an old version if available. A most recent coherent set of the available older versions is found and provided. The degree of degradation increases gradually as the system experiences more and more failures. Graceful degradation is desirably complementary to fault tolerance.

20 Claims, 8 Drawing Sheets

OTHER PUBLICATIONS

Rodrigues, et al., "Rosebud: A Scalable Byzantine-Fault-Tolerant Storage Architecture", pp. 1-14, http://www.pmg.lcs.mit.edu/~rodrigo/tr-932.pdf.

Sivathanu, et al., "Improving Storage System Availability with D-GRAID", Date: May 2005, pp. 133-170, vol. 1, Issue: 2, ACM Press, New York, USA.

* cited by examiner

|  | $c_1$ | $c_2$ | $c_3$ | $c_4$ | $c_5$ |
|---|---|---|---|---|---|
| Read |  | $<o_1, 1>$ |  | $<o_1, 2>$ $<o_2, 1>$ | $<o_2, 1>$ $<o_3, 1>$ |
| Write | $<o_1, 2>$ $<o_3, 1>$ | $<o_1, 2>$ | $<o_2, 1>$ |  | $<o_2, 2>$ $<o_3, 2>$ |

Linearization Order ⟶

GRACEFULLY DEGRADABLE VERSIONED STORAGE SYSTEMS

BACKGROUND

There is an increasing need for large-scale storage systems to maintain a large amount of data. Such systems must be highly reliable and available. Traditionally, fault tolerance has been the solution for reliable storage systems. Systems are guaranteed to operate correctly as long as the assumptions required by those mechanisms are satisfied. The assumptions often include a bound on the number of failures in the system. Such a system fails when those assumptions are invalidated; for example, when the system experiences excessive and correlated failures.

Reliable distributed systems are typically designed to be fault tolerant. Fault tolerance mechanisms ensure system correctness, but only with respect to a system model that specifies the type and extent of failures. Most of the time, the system exists in a normal state, with no faulty components or by tolerating the failures of a few components. However, systems may suffer excessive failures that go beyond what is allowed in the system model. In these cases, fault tolerance mechanisms enter an abnormal state, are unable to mask failures, and cause reliable systems to fail.

Thus, a typical reliable distributed system is available in normal state, but becomes completely unavailable after transitioning to an abnormal state. For example, a system that adopts the replicated state machine approach tolerates a minority of machine failures, but cannot tolerate when a majority of machines becomes unavailable.

It might seem that with sufficient replication the probability of a system entering an abnormal state may be virtually eliminated. However, this assumes that failures are independent. Such an assumption is often invalidated in practice (e.g., due to subtle software bugs, a certain batch of disks being defective, or accidental triggering of the power off button). Furthermore, conventionally tolerating an excessive number of failures through replication requires fault tolerant mechanisms to incur prohibitively high resource cost (e.g., in terms of I/O, CPU, and storage) and significantly reduces system performance, thereby making it an impractical choice.

SUMMARY

A distributed system can maintain multiple versions of data, with different versions desirably maintained on different sets of machines. When the latest version of data is unavailable, an available, older version is desirably returned. Such a system may offer graceful degradation in that the more failures the system experiences, the more outdated the returned results are likely to be.

Desirably, an example system embraces both fault tolerance and graceful degradation. When the failures in a system exceed the capability of the fault tolerance mechanism that is being used, graceful degradation is used. In graceful degradation, because the latest version is unavailable, an available, older version of data is retrieved from a versioned data store and then used. An indication may be provided to indicate that the responses are degraded, so that the user may understand that the results he is seeing or receiving may not be based on the latest version of the data.

Even during degradation, it is desirable that an example system provides a well-defined semantics that conforms to a particular specification. Example specifications for degradation include timestamp-based designs, dependency-based designs, and weak-dependency based designs.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION

Degradation of a system under massive and correlated failures is inevitable. For better availability, the degradation should be graceful in that the degree of degradation increases gradually as the system experiences more and more failures. Graceful degradation is desirably complementary to fault tolerance.

Figure 1:
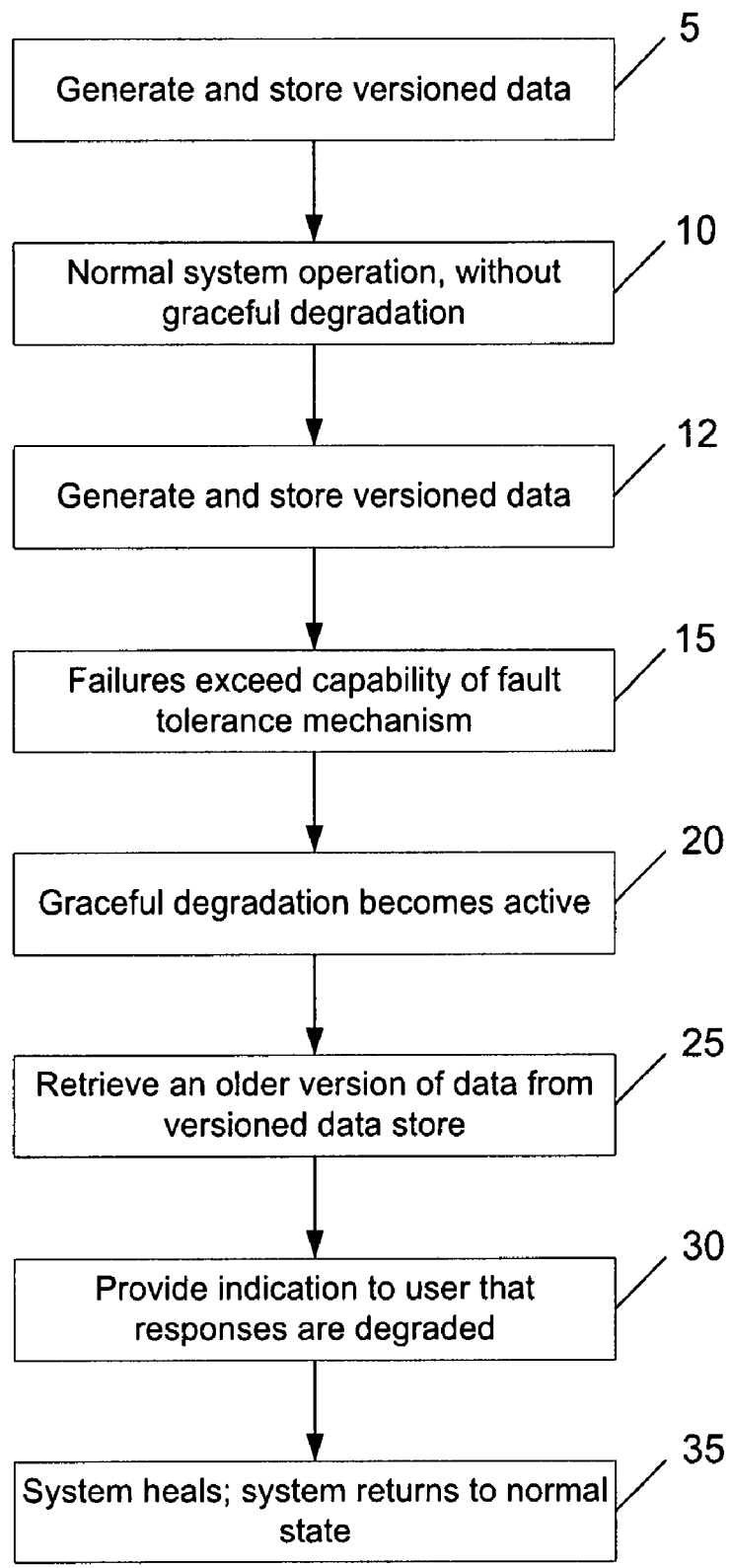
FIG. 1 is a flow diagram of an example operational process involving an example graceful degradation system.

FIG. 1 is a flow diagram of an example operational process involving an example graceful degradation system. At step 10, the system is operating without graceful degradation, desirably preserving the guarantees and semantics when there is no failure or when the fault tolerance mechanism is capable of masking the failures. At step 15, however, the failures do exceed the capability of the fault tolerance mechanism that is being used, and at step 20, graceful degradation desirably takes effect. At this point, an older version of data is retrieved from a versioned data store and used (e.g., provided as output to the user, used in subsequent calculations, etc.) at step 25. It is contemplated that versioned data may be generated and stored at any point in the process, such as at step 5 before the system is operating, or at step 12 after the system has begun operating.

The system desirably provides an indication to the user at step 30 that the responses are degraded, so that the user may understand that the results he is seeing or receiving may not be based on the latest version of the data. When the system heals, at step 35, the system desirably comes back into the normal state with non-degraded responses. Desirably, an example system embraces both fault tolerance and graceful degradation.

Figure 2:
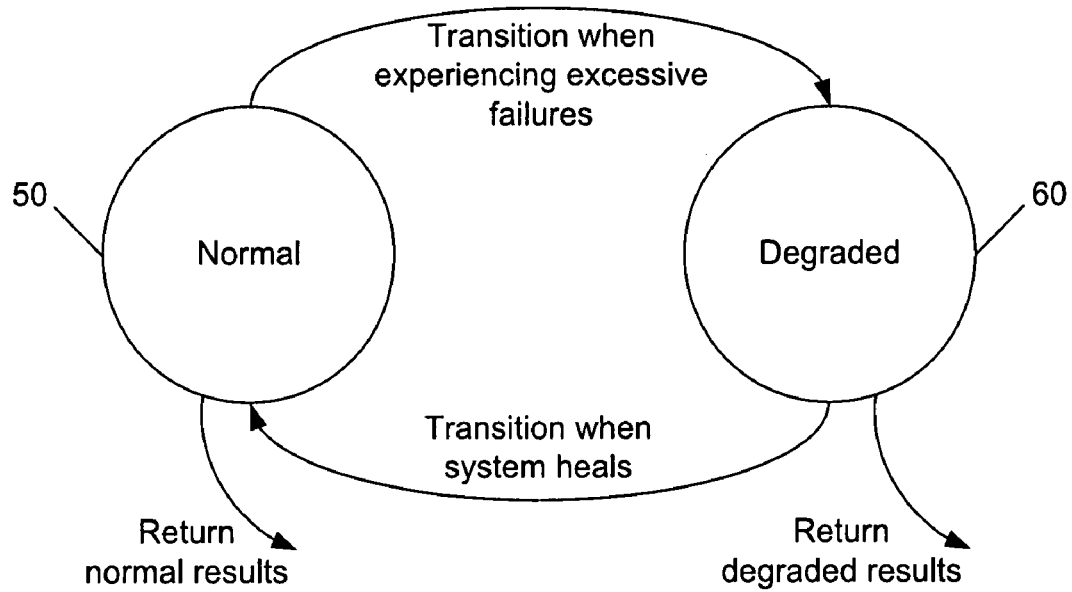
FIG. 2 is a diagram of an example state machine.

FIG. 2 is a diagram of an example state machine that models aspects of an example system. Two states are provided, normal 50 and degraded 60. The system desirably transitions from normal to degraded when experiencing excessive failures. In the normal state 50, new versions of data are generated and normal results are returned. In the degraded state 60, degraded results, as described herein, are returned.

A degree of degradation can be measured in terms of functionality; for example, in terms of the reduction in semantics and guarantees that the system provides or in terms of the percentage of operations that the system is unable to perform. Such a definition is often application-dependent. However, by using versions, as described herein, a general and application-independent definition of degradation is provided.

Figure 3:
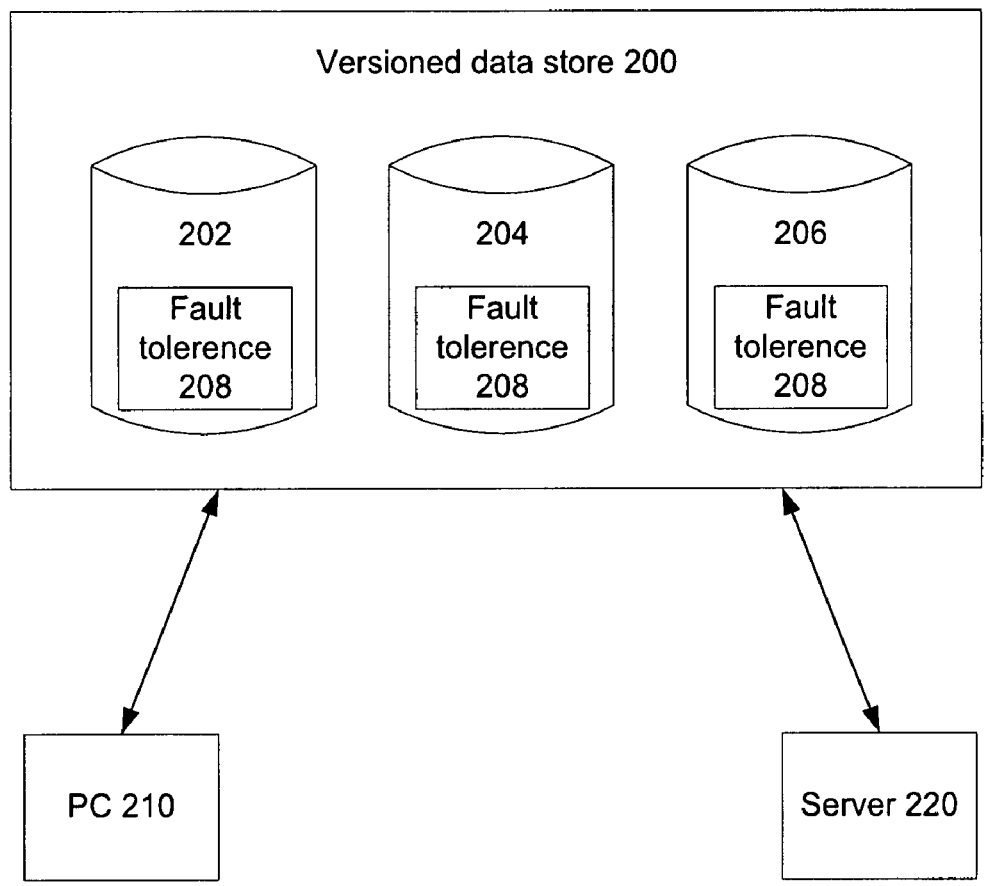
FIG. 3 is a high level diagram of an example system.

As described further herein, graceful degradation may be combined with fault tolerance to provide reliable distributed systems. FIG. 3 is a high level diagram of an example system in which graceful degradation is provided, using a versioned data store 200 that may be accessed by one or more systems or computing devices, such as personal computers 210 or servers 220. The versioned data store 200 comprises multiple data storage devices 202, 204, 206, across which various versions of a data item are stored, including the latest version of the data item as well as earlier versions. It is contemplated that any number of data storage devices may be associated with, or part of, the versioned data store 200, and that the data storage devices 202, 204, 206 are shown as representative only. A fault tolerance mechanism 208 is optionally provided in conjunction with one or more of the data storage devices. For example, each data storage device 202, 204, 206 may comprise a set of physical machines in which multiple copies of a version may be stored. A more detailed example system is described herein.

During operation, degradation involves returning an old view of the system. Graceful degradation is achieved by maintaining multiple versions for each data item (e.g., on the data storage devices 202, 204, 206), and returning a view with an available older version when the latest version is unavailable.

Consistency of the view consisting of old versions is described, along with the creation of new branches from an old view and merging branches, and implications of graceful degradation on system design. For example, an example atomic consistency model for degraded responses is defined and described. A consistent view is provided to a user during degraded operation, and versions are maintained that allow branching during degraded operation. Desirably, the system may recover from degraded operations to a fully functional state.

A versioned data store offers a continuous spectrum along the time dimension. Using versions for graceful degradation adds a dimension of choices to the design of reliable distributed systems. A tradeoff emerges between maintaining a greater number of versions while reducing the level of redundancies for fault tolerance. At one extreme, one can choose to maintain enough versions, while not using any fault tolerant mechanisms. This might be desirable because such a design avoids the daunting task of maintaining consistency among all replicas and likely improves the write performance because only one server needs to write the new version. This is at the expense of reduced availability in that the system will have to offer an old version under a single failure. Maintaining multiple versions introduces cost as well, such as the storage cost of holding multiple versions. In addition, versions have to be carefully placed so that most failures still result in some version being available.

Graceful degradation copes well with both massive transient failures and permanent data loss. In both cases, an example system desirably remains functional in a degraded mode. In the case of transient failures, an example system is able to return to a normal state when the system heals. In the case of permanent data loss, the system may revert to a degraded state that minimizes the impact of the data loss and then proceed. Because such a mechanism already exists in the system, there is no need for the system to be taken off-line, analyzed, and restored when dealing with data loss.

Regarding consistency, a series of specifications for degradation is provided. In particular, three example application-independent specifications for degraded views of the system state under excessive failures are described. The specifications apply to a general deterministic state machine and are independent of any specific application semantics. The specifications extend the well-known notion of linearizability, and provide degradation semantics to clients, so that a client can use a system even when it is degraded. Gracefulness is also provided.

The semantics of a system may be modeled using a deterministic state machine. The system starts with an initial state $s_0$. It then processes a sequence of commands in serial, produces a response to each command, and transitions to a new state if the command demands so. Commands that cause state transitions are referred to as updates, whereas those that do not are called queries.

The system state consists of a set of objects. Each command c reads a set of objects, denoted as its read set or c.rs, and updates a set of objects, denoted as its write set or c.ws.

Clients might issue commands concurrently. It is assumed that when processing commands concurrently, the system ensures that the execution is equivalent to a serialized execution.

Consider an execution that consists of a set of commands C. A valid serialization imposes a total ordering on commands in C, such that, if the system executes the commands in C in this total order, then each command reads the same values in the two executions, produces the same response, and leads to identical final states. A valid serialization is represented as the sequence of commands in C ordered by the total ordering.

Linearizability further imposes an ordering constraint related to the real time. Given an execution with a set of commands C, a valid linearization is first a valid serialization for the execution. Furthermore, if a command $c_1 \in C$ completes before another command $c_2 \in C$ starts, then $c_1$ must precede $c_2$ in the total ordering imposed by the serialization. A valid linearization is represented as the sequence of commands in C under that total ordering.

Systems that achieve linearizability are contemplated and an execution is represented with a valid linearization. For example, $(c_1, c_2, \ldots, c_n)$ describes an execution that has a valid linearization with a total order $c_1 < c_2 < \ldots < c_n$. $M(c_1, c_2, \ldots, c_i)$ may be used to denote the state of the system implementing state machine M after executing $c_1, c_2, \ldots, c_i$ in sequence. As a special case, for an empty sequence, $M(\ )$ is set to $s_0$, the initial state of the system.

Given an execution $e=(c_1, c_2, \ldots, c_n)$ starting with an initial state $s_0$ and resulting in a state $s_n$, any queries issued to the system after e are desirably executed on state $s_n$ normally. Under excessive failures, the latest values of the objects requested by a query might become unavailable. Conventional systems have to fail the query, which can be thought of as executing the query in the original state $s_n$. This effectively rolls back the entire execution. To facilitate graceful degradation, it is desirable that the system allows the execution of the query on some coherent intermediate state, referred to as a valid degraded state. Example specifications are provided herein for valid degraded states.

Prefix linearizability is defined to capture any state that is the result of executing a prefix of a linearization. For execution $e=(c_1, c_2, \ldots, c_n)$, any state $M(c_1, c_2, \ldots, c_k)$ for $1 \leq k \leq n$ is considered a valid degraded state. Prefix serializability is defined to capture any state that is the result of executing a prefix of any valid serialization. Given an execution $e=(c_1, c_2, \ldots, c_n)$, for any valid serialization $(c_{i1}, c_{i2}, \ldots, c_{in})$ of e, any state $M(c_{i1}, c_{i2}, \ldots, c_{ik})$ for $1 \leq k \leq n$ is considered a valid degraded state.

Valid subsequence is also defined. For an execution $e=(c_1, c_2, \ldots, c_n)$, define a subsequence $e'=(c_{j1}, c_{j2}, \ldots, c_{jk})$, with $1 \leq j_1 \leq j_2 < \ldots < j_n \leq n$ to be valid if and only if, for each $c_{ji}$ with $1 \leq i \leq k$, the values of the objects in its read set and in its write set are the same as before the execution of $c_{ji}$ in e and in e'. More precisely, let I be the index of $c_{ji}$ in e, the values of the objects in $c_{ji}$'s read set or write set are the same after executing $c_1, c_2, \ldots, c_{i-1}$ as those after executing $c_{j1}, c_{j2}, \ldots, c_{j(i-1)}$.

Intuitively, a valid subsequence preserves the effects of all commands in the subsequence as in the original execution. However, unlike a valid serialization, a valid subsequence does not impose any constraints on commands that are excluded from the subsequence. It is as if those excluded commands were undone from the original execution.

Subsequence linearizability is defined. Given an execution $e=(c_1, c_2, \ldots, c_n)$, any state $M(c_{j1}, c_{j2}, \ldots, c_{jk})$ for a valid subsequence $(c_{j1}, c_{j2}, \ldots, c_{jk})$ with $k \geq 0$ and $1 \leq j_1 \leq j_2 < \ldots < j_k \leq n$ is considered a valid degraded state.

Prefix linearizability is stronger than both prefix serializability and subsequence linearizability as any valid degraded state with respect to prefix linearizability is valid with respect to prefix serializability and subsequence linearizability. This is because the valid linearization is a valid serialization and its prefix is by definition a valid subsequence.

In the example specifications herein, n–k indicates how many commands the valid degraded state fails to reflect. n–k is referred to as the degradation degree, and it may be used to measure the gracefulness of a degraded state.

Gracefully degradable systems may use versions. Example system designs are described for degradable versioned systems that satisfy the example specifications set forth herein. The example specifications for valid degraded states provide clients with some state reflecting a partial execution (hence the use of the execution prefix and subsequence) when the most up-to-date view is unavailable. The maintenance of multiple versions for each piece of data makes it possible to expose such a state. The example designs are for such versioned systems.

In a versioned system, each update creates new versions of objects, rather than overwriting the current versions. Version v of an object o is referred to as object version $<o, v>$. In a distributed versioned system, different versions of the same object could reside on a different set of storage servers to reduce the chances of all versions of an object being unavailable due to server failures.

Regarding valid degraded state and coherency, a degraded state consists of a set of object versions, one for each object. It might seem that one could simply define the degraded state to include all the most recent available object versions, one for each object. This could lead to states that are clearly unreasonable however. For example, consider an execution, $e=(c_1, c_2)$ where $c_1$ creates $<o_1, 1>$ and $<o_2, 1>$, and $c_2$ creates $<o_1, 2>$ and $<o_2, 2>$. Consider the case where $<o_1, 2>$ becomes unavailable. A degraded state consisting of the most recent available versions would be $\{<o_1, 1>, <o_2, 2>\}$. This state is problematic because it reflects a partial completion of $c_2$, and violates the atomicity of command $c_2$.

When some latest object versions become unavailable, for a query, the system wants to find the most recent and available versions of the requested objects that are coherent. With a specification for valid degraded states, a set of object versions is coherent if and only if there exists a valid degraded state that includes all the object versions in the set.

At a given system state, there might be multiple coherent sets for a given set of objects. A "more recent" relation among the coherent sets for the same system state and the same set of objects is defined. Given two coherent sets $S_1$ and $S_2$ for a set O of objects, $S_1$ is defined to be more recent than $S_2$ if and only if the following holds: for any $o \in O$, let $<o, v_1> \in S_1$ and $<o, v_2> \in S_2$ be the corresponding object versions in the two coherent sets, $v_1 \geq v_2$ holds. Given a set O of objects at a given system state, a coherent set is called most recent if no other coherent sets are more recent. There might not be a unique most recent set because more recent relations for a given set of coherent sets might not constitute a total order. It is assumed that each object has an initial version when the system starts. Any set of those initial object versions is defined to be coherent.

For the example designs described herein, techniques are described that allow the system to check whether a set of object versions is coherent, prove that the coherency is consistent with one of the example specifications, and show how to find a most recent coherent set.

A timestamp-based design may be used to check the coherency of an object version set by seeing whether those object versions co-exist at some real time in the past. This can be achieved if each object version records one timestamp to indicate when it is created and another timestamp to indicate when a newer version of the same object is created. The two timestamps specify the time interval during which the object version exists. A set of object versions is coherent as long as the time intervals of all object versions overlap; that is, there exists a time that falls into the interval of every object version in the set.

Figure 4:
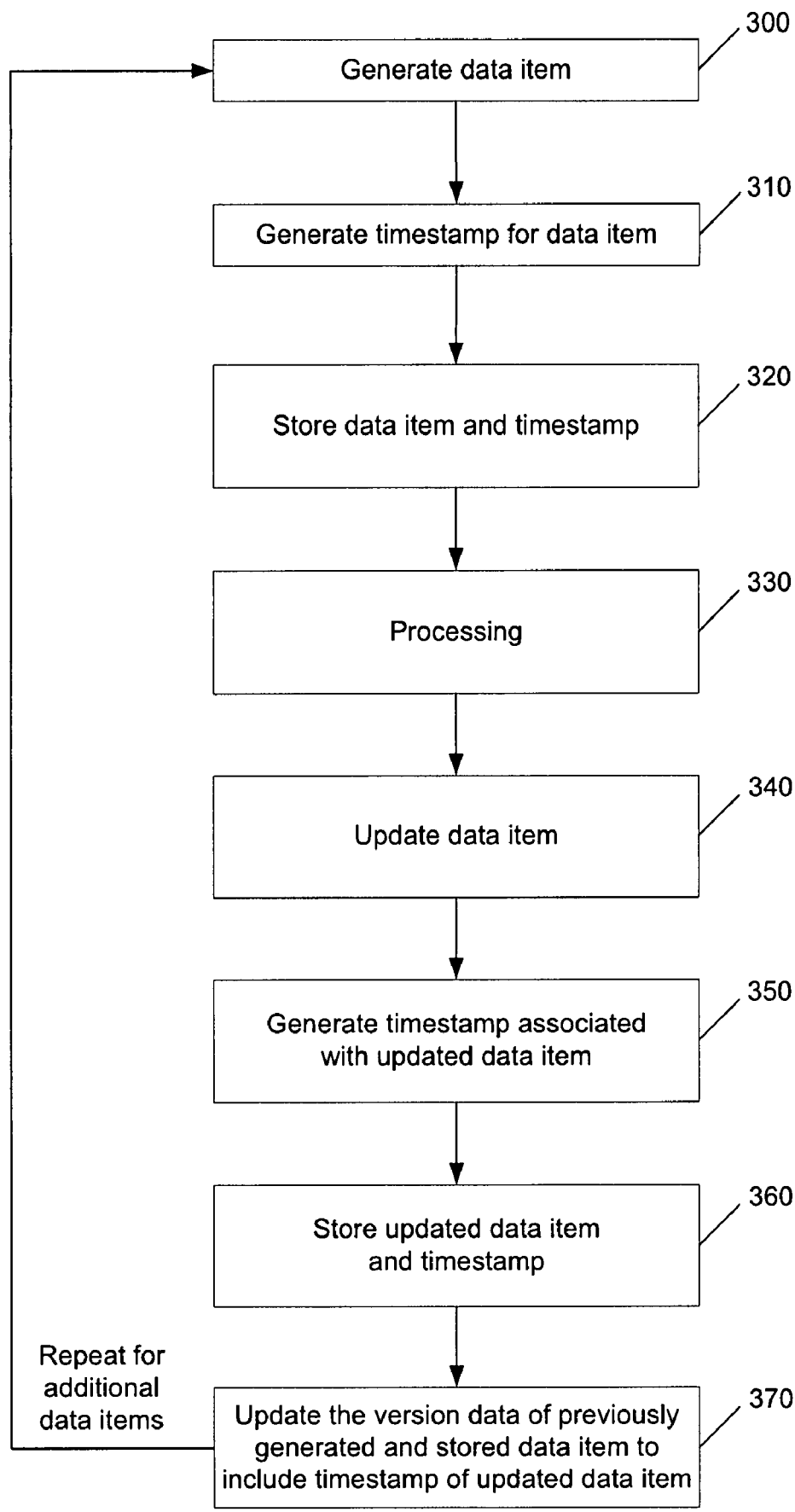
FIG. 4 is a flow diagram of an example timestamp-based process.

FIG. 4 is a flow diagram of an example timestamp-based process. At step 300, a data item is generated, and a timestamp associated with the data item is generated at step 310. At step 320, the data item is stored with version data (e.g., as metadata) based on a timestamp. Subsequent processing occurs at step 330, and then at some point, the data item is updated at step 340. A timestamp associated with this updated data item is generated at step 350, and at step 360, the updated data item is stored with version data based on the associated timestamp. At step 370, the version data that is stored and associated with the previously generated and stored data item (from step 320) is updated to include the timestamp information from the newer version of the data (from step 350). Steps 300-370 may be repeated for additional data items. Desirably, a set of versions can be achieved that is coherent. It is noted that timestamps may be associated with each atomic action, and the atomic actions may be linearized based on the timestamps of the actions. Thus, if an atomic operation reads a value written by a later operation, it is desirably aborted.

The timestamps are desirably not created by simply using the real time values at which object versions are created even if it is assumed that all servers in the system have perfectly synchronized clocks. For example, consider an execution of two commands. Command $c_1$ creates object version $<o_2, 1>$ at time $t_2$, while command $c_2$ creates object version $<o_1, 1>$ at $t_1$ and $<o_2, 2>$ (without reading $<o_2, 1>$) at $t_3$. With $t_1 < t_2 < t_3$, $c_1$ and $c_2$ form a valid linearization. Using those timestamps, $<o_1, 1> <o_2, 1>$ might be considered coherent because they co-exist at $t_2$. However, the two reflects a partial execution of $c_2$ and violates atomicity. The problem arises because $t_2$ is in the middle of the execution of $c_2$. So timestamps are desirably assigned to reflect the linearization order, but also it should be ensured that they do not divide the execution of any command.

Timestamp-based concurrency control techniques, a well-known approach to serialization in database systems, can be used for creating timestamps. In an example technique, each transaction is assigned a timestamp. The execution of committed transactions is desirably equivalent to an execution of those transactions in the serialized order based on the assigned timestamps. This can be enforced if the system maintains a read timestamp o.rt and a write timestamp o.wt for each object o, where the read (resp.write) timestamp tracks the highest timestamp among the transactions that read (resp.write) the object. Any transaction with timestamp t, denoted by $T_t$, will desirably be aborted if it attempts to write to an object o with o.rt>t or read an object o with o.wt>t.

Multiversion concurrency control (MVCC) provides an improvement by maintaining multiple versions for each object. For each object version <o, v>, <o, v>.rt records the timestamps of all transactions reading that object version and <o, v>.wt records the timestamp of the transaction that creates that object version. A transaction $T_t$ reading an object o will read the highest object version <o, v> with <o, v>.wt<t. A write by a transaction $T_t$ will be rejected if there exists a read timestamp $t_r \in$ <o, v>.rt for some v, such that $t_r$>t and $t_r$<<o, v'>.wt for the lowest version <o, v'> with <o, v'>.wt>t. Using the timestamps at the starting time for each transaction, MVCC yields a valid linearization of all committed transactions based on the timestamps.

MVCC may be extended to define coherency as follows, for example. For an object version <o, v>, denote its previous and next versions as <o, v>.prev and <o, v>.succ respectively. The system stores with each object version <o, v> not only <o, v>.wt but also <o, v>.succ.wt. Set <o, v>.succ.wt to infinity for any <o, v>.succ that does not yet exist.

Thus, for timestamp-based coherency, a set S of object versions is coherent if and only if there exists a timestamp t, such that for each <o, v>∈S, condition <o, v>.wt≦t≦<o, v>.succ.wt holds. The time t in the definition can be associated with the coherent set. The most recent coherent set is the one with the highest timestamp.

Figure 5:
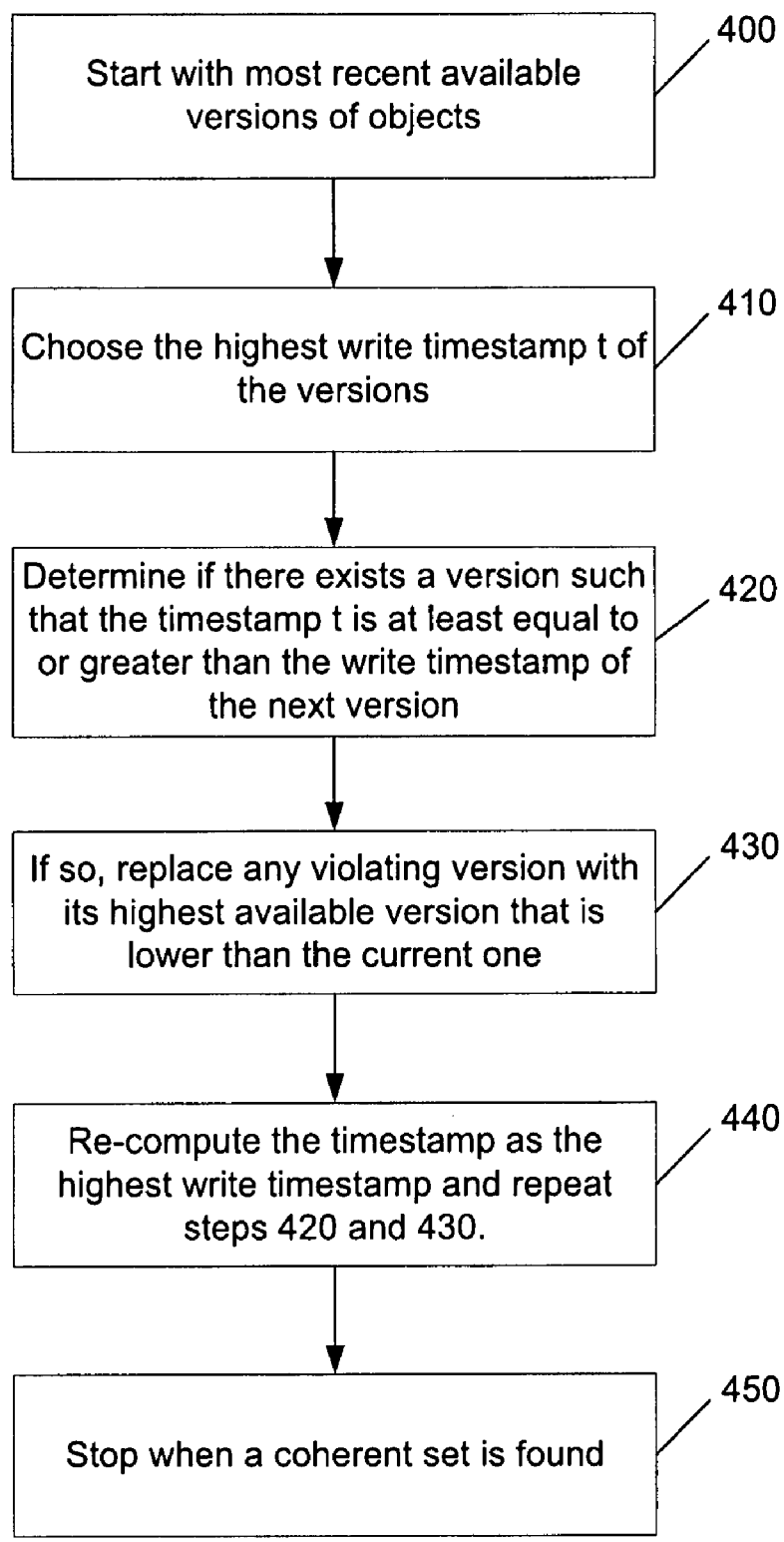
FIG. 5 is a flow diagram of an example method of identifying a most recent coherent set of stored objects.

Timestamp-based coherency satisfies prefix linearizability. In a graceful degradation operating mode, it may be desirable to retrieve or otherwise identify the most recent coherent set of objects or data items that are being stored. FIG. 5 is a flow diagram of an example method of identifying the most recent coherent set of stored objects. To find the most recent coherent set for a set O of objects, start at step 400 with a set S of the most recent available versions of the objects in O and, at step 410, choose t to be the highest write timestamp among all object versions in the set.

If, at step 420, there exists an object version such that the timestamp t is at least equal to or greater than the write timestamp of the next version (i.e., <o, v>∈S such that t≦<o, v>.succ.wt), replace any violating object version (i.e., <o', v'>∈S satisfying <o', v'>.wt≧<o, v>.succ.wt) with its highest available version that is lower than the current one, at step 430. Then, at step 440, re-compute t as the highest write timestamp among all object versions in the set and repeat this process. This continues until a coherent set is found at step 450. Such a process is guaranteed to terminate because the set of initial object versions is defined to be coherent.

Timestamp-based coherency conveys a degradation semantics: it provides a state that existed sometime in the past. The system lets clients "time travel" to the latest point in the past where the requested view is completely preserved. This is a semantics that clients can easily make use of, as clients clearly understand the semantics of the state because it was the up-to-date state sometime in the past.

Figures 6, 7:
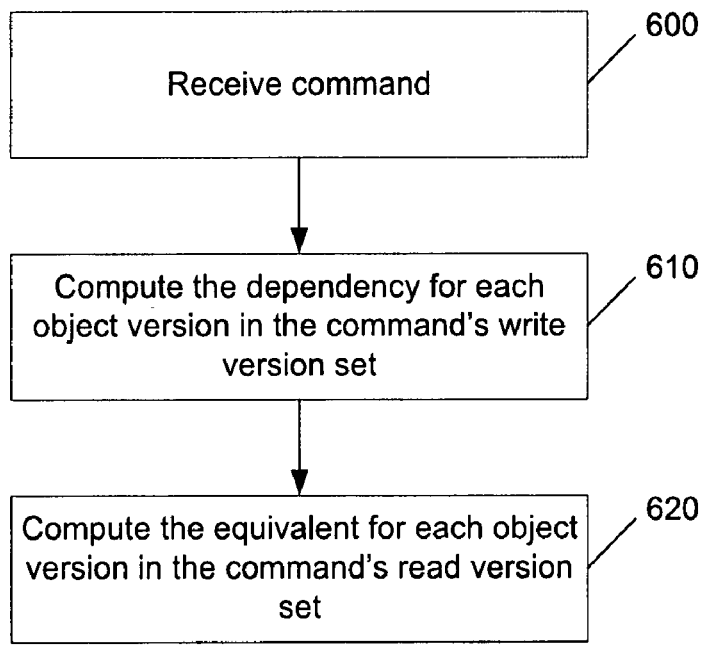
FIG. 6 is a diagram of a sample execution that is useful in describing various example aspects.
FIG. 7 is a flow diagram of an example dependency-based process.

However, timestamp-based coherency is rather strong. Consider the diagram of FIG. 6, which shows an example execution ($c_1, c_2, c_3, c_4, c_5$). In FIG. 6, the read version set and the write version set are shown for each command. For each command, FIG. 6 shows the set of object versions it reads and the set of object versions it creates.

For example, in the case where all object versions except <$o_1$, 2> are available, with timestamp-based coherency, the most recent coherent set for all objects will be {<$o_1$, 1>, <$o_2$, 0>, <$o_3$, 1<}; that is, the state after executing $c_1$ only. Command $c_3$ has to be excluded even though it operates on an unrelated object $o_2$. This could exacerbate data loss when the system tries to recover to a coherent state after suffering permanent loss of some object versions.

Consider an example with a system that maintains the source code tree of a large piece of software (e.g., Linux or Cygwin). If the latest version of a file created in March 2006 becomes unavailable and the last update was in February 2006, timestamp-based coherency will present the source tree view in February 2006 to the clients. The clients will be able to build this source tree and obtain an old version of the software.

There might be independent packages (e.g., packages for python and perl) in the source tree. Suppose the python package was updated in February 2006 and April 2006, and the perl package was updated in January 2006 and March 2006. The loss of the perl package in March 2006 should desirably not force the use of the old version of python in February 2006, as timestamp-based coherency mandates. Prefix serialization allows the view with the January 2006 version of perl and April 2006 version of python. Thus, prefix serialization can potentially allow a more graceful degradation.

A dependency-based design is described. In the example in FIG. 6, prefix serialization allows a view that reflects more commands ($c_1, c_3, c_2, c_4, c_5$) that constitute a valid serialization. With the loss of <$o_1$, 2>, a prefix ($c_1, c_3$) of the serialization yields a state with {<$o_1$, 1>, <$o_2$, 1>, <$o_3$, 1>}. A valid serialization can be obtained by swapping $c_2$ and $c_3$ in the linearized execution. This is because $c_2$ and $c_3$ are independent as defined below.

The set of objects that a command c reads and writes may be denoted as c.rs and c.ws, respectively. Similarly, the set of object versions c reads and writes may be referred to as its read version set c.rvs and its write version set c.wvs. Two commands c and c' (c executed before c') are defined to be conflicting if c.rs∩c'.ws≠0 (read-write conflict), c.ws∩c'.ws≠0 (write-write conflict), or c.ws∩c'.rs≠0 (write-read conflict) holds. Otherwise, they are independent.

Starting with a valid linearization of an execution, swapping two consecutive independent commands one or more times leads to a valid serialization. This is because each command in the new sequence will be reading the same set of object versions and creating the same set of object versions as in the original execution.

FIG. 7 is a flow diagram of an example dependency-based process. In order to check whether a set of object versions satisfies the coherency consistent with prefix serialization, for each object version ov, the system desirably maintains two sets (dependency and equivalent), ov.Dep and ov.Equiv, during an execution e, as follows.

A command c in e is received at step 600. When executing command c, for each object version in its write version set, its dependency Dep set is set at step 610 to be the union of the following: c's write version set, the dependency sets for object versions in c's read version set, the equivalent sets for the previous versions of the object versions in c's write version set, and dependency sets for the previous versions of the object versions in c's write version set. The equivalent Equiv for each object version in c's write set is initially set to empty.

For each object version in c's read version set, its equivalent Equiv set is set at step 620 to be the union of the current value of its equivalent set, the dependency set for each object version in c's read version set, and the dependency sets for the previous versions of the object versions in c's write version set.

Intuitively, ov.Dep captures the set of object versions that ov depends on: any lower versions for those objects do not co-exist with ov. Also, note that both Dep and Equiv are reflective. The dependency-based coherency condition is defined as follows. A set S of object versions is coherent with respect to an execution e if and only if for any object versions $<o_1, v_1> \in S$ and $<o_2, v_2> \in S$, the following holds: if $\exists v, <o_1, v> \in <o_2, v_2>$.Dep, then $v \leq v_1$ holds. Similarly, if $\exists v, <o_2, v> \in <o_1, v_1>$.Dep, then $v \leq v_2$ holds.

Figure 8:
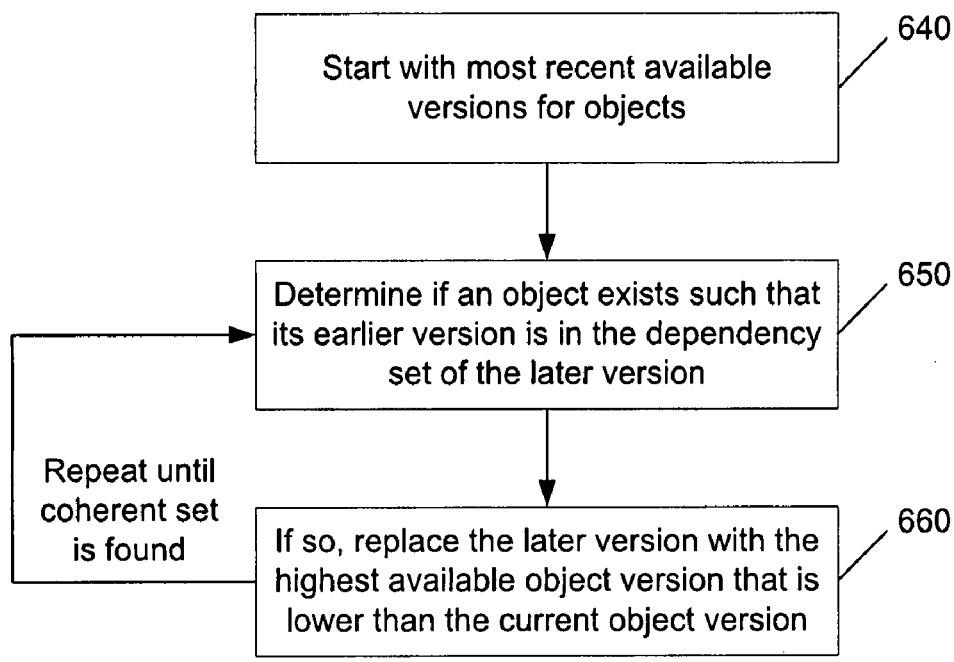
FIG. 8 is a flow diagram of another example method of identifying a most recent coherent set of stored objects.

It is noted that dependency-based coherency satisfies prefix serializability. FIG. 8 is a flow diagram of an example method of identifying a most recent coherent set of stored objects for a dependency-based design. To find a most recent coherent set for a given set O of objects, start with the set S of the most recent available versions for objects in O at step 640, and perform the following steps repeatedly until a coherent set is found. If, at step 650, there exists an object version 1 and an object version 2, where object version 1 is in the dependency set of object version 2, then, at step 660, replace object version 2 with the highest available object version that is lower than the current object version (i.e., if there exists $<o_1, v_1> \in S$, $<o_2, v_2> \in S$, and $<o_1, v> \in <o_2, v_2>$.Dep such that $v_1 < v$, replace $<o_2, v_2>$ with the highest available object version of $o_2$ that is lower than the current object version).

Note that different orders of choosing conflicting pairs could lead to different results; that is, there could be multiple most recent coherent sets that are not comparable.

Dependency-based coherency can be weakened. For example, for a given execution e, a set S of object versions is coherent if and only if for any object versions $<o_1, v_1> \in S$ and $<o_2, v_2> \in S$, the following holds: if $\exists v, <o_1, v_1> \in <o_2, v_2>$.Dep$_w$, then $v \leq v_1$ holds; if $\exists v, <o_2, v> \in <o_1, v_1>$.Dep$_w$, then $v \leq v_2$ holds.

Weak-dependency-based coherency achieves subsequence linearizability. Identifying a most recent coherent set of stored objects for a weak-dependency-based design is similar to that for the dependency-based design. Thus, to find the most recent coherent set for a given set O of objects, start with the set S of the most recent available versions for objects in O, and perform the following steps repeatedly until a coherent set is found. If there exists an object version 1 and an object version 2, where object version 1 is in the dependency set of object version 2, then replace object version 2 with the next highest version of the object that is available (i.e., if there exists $<o_1, v_1> \in S$, $<o_2, v_2> \in S$, and $<o_1, v> \in <o_2, v_2>$.Dep$_w$ such that $v_1 < v$, replace $<o_2, v_2>$ with the next highest version of $o_2$ that is available).

Prefix linearizability is stronger than prefix serializability and subsequence linearizability, and timestamp-based coherency is stronger than dependency-based coherency and weak-dependency-based coherency. Therefore, a set of object versions that satisfies timestamp-based coherency is guaranteed to satisfy dependency-based coherency and weak-dependency-based coherency for the same execution.

Dependency-based coherency is stronger than weak-dependency-based coherency. Consequently, given any system state, there exists a most recent coherent set $S_1$ for weak-dependency-based coherency, a most recent coherent set $S_2$ for dependency-based coherency, and a most recent coherent set $S_3$ for timestamp-based coherency, such that $S_1$ is more recent than $S_2$, which is in turn more recent than $S_3$. If the protocols for finding a most recent coherent set for dependency-based coherency or weak-dependency-based coherency always choose to roll back object versions with the highest timestamp and break ties in the same deterministic way, then the resulting most recent coherent sets will obey the more recent relation. The use of such protocols is assumed in the description below.

A stronger coherency condition translates into a higher degradation degree. This is illustrated with respect to the example shown in FIG. 6. When object version $<o_1, 2>$ becomes unavailable, the most recent coherent set according to timestamp-based coherency is $\{<o, 1> <o_2, 0> <o_3, 1>\}$ reflecting only $c_1$, and therefore a degradation degree of 4. The most recent coherent set according to dependency-based coherency is $\{<o_1, 1> <o_2, 1> <o_3, 1>\}$, reflecting c1 and $c_3$, and therefore a degradation degree of 3. The most recent coherent set according to weak-dependency-based coherency is $\{<o_1, 1> <o_2, 2> <o_3, 3>\}$, reflecting $c_1$, $c_3$, and $c_s$, and therefore a degradation degree of 2.

The difference between the set for dependency-based coherency and the set for weak-dependency-based coherency is due to $C_4$, which conflicts with $c_2$ and $c_5$. This prevents moving $c_5$ before $c_2$ in any valid serialization. But for weak-dependency-based coherency, both $c_2$ and $c_5$ are removed from the subsequence and the coherency condition has no obligation for the subsequence to be extended to include $c_2$ and $c_5$, with the guarantee that they execute in the same states as in the original execution.

There is an inherent tradeoff between the semantics ensured by the valid degraded states and the degradation degree. Usually, the stronger the semantics, the higher the degradation degree. A client can choose the weakest semantics that it desired in order to get a less degraded view of the system.

For timestamp-based coherency, the system provides an accurate time travel capability. It provides a strong semantics, but at the expense of potentially higher degradation degree.

For dependency-based coherency, the system provides a virtual time travel capability in that the system has the freedom to assign virtual timestamps to decide in which order commands are executed, while preserving the responses from the system and the final state of the system. Going back to the example of maintaining a source code tree for a large piece of software, clients might notice that the system returns an April version of python, but with the old January version of perl. Those two versions never co-existed as the up-to-date versions in the history of the source code tree. Any real dependencies not captured by dependency Dep might lead to anomalies. For example, the April version of python might implicitly depend on new features that are only available in the March version of perl. In this case, the resulting coherent set according to prefix serializability might not be consistent in the clients' view.

For weak-dependency-based coherency, the system desirably provides an undo capability to remove the effects of certain commands. In the example of maintaining the source code tree, further assume that at the end of March a command c is executed to collect statistics about the entire source code tree. Such a command will make the April version of python depend on the March version of perl according to Dep, because the execution of the command has the February version of python and March version of perl in its read version set. Even prefix serializability will force the state to contain only the February version of python. However, if weak-dependency-based coherency is used, that command c can be undone, making it possible to return the April version of python. Clients might observe more anomalies in this case. In particular, the statistics collected by c might not make sense anymore. Among other things, the statistics might indicate a higher version of perl with a lower version of python.

From a practical point of view, there is also a consideration of overhead in maintaining the metadata to check whether a set of object versions is coherent or not. In the examples described herein, the metadata for an object version is desirably maintained when the object version is created or read. Dependency-based coherency uses the most amount of metadata, which is a superset of what weak-dependency-based coherency uses. The timestamp-based coherency uses only two timestamps. It is therefore possible to support all three examples at about the same overhead as the one for dependency-based coherency, giving clients the flexibility to choose the right semantics at different occasions.

It has been assumed that the version numbers for an object are totally ordered; however, this might not be the case. When given outdated objects in a degraded response, users might choose to work on those outdated versions and create new ones. Those new versions form branches from the original linear progression of object versions.

Branching offers options to users when the system is degraded and might be desirable to the availability of many services. For example, when the information about the latest bids is unavailable, an auction service might let users see the bids an hour ago. While this is an improvement over being unavailable, it is more useful to allow users to place bids based on such outdated information. Those bids can often be merged with the existing ones when the system recovers. Similarly, an airline reservation system might continue to allow travelers to book tickets and select seats, unconfirmed, even if it does not know the precise up-to-date booking information. Those reservations can be confirmed or changed when the system recovers.

Desirably, branching is permitted only when degraded. Branches should be merged and resolved appropriately when the system returns to a normal state.

In general, versions of an object form a partial order $\prec$, where $v_1 \prec v_2$ indicates that $v_2$ evolves from $v_1$. If neither $v_1 \prec v_2$ nor $v_2 \prec v_1$ holds, then $v_1$ and $v_2$ belong to two conflicting branches and should be merged. One way to encode a partial ordering $\prec$ in versions is as follows. The first version of an object has version number 1. A new version created from v as the ith branch has the version number v o i. Here $v \prec v$ o i holds. A new version created from merging a list of versions $v_1, v_2, \ldots, v_k$ has the version number $[v_1, v_2, \ldots, v_k]$. Here, $v_i \prec [v_1, v_2, \ldots, v_k]$ holds for any $1 \leq i \leq k$. Partial ordering is transitive. That is, $v_1 \prec v_2$ holds if there exists a v such that $v_1 \prec v$ and $v \prec v_2$ hold.

Figure 9:
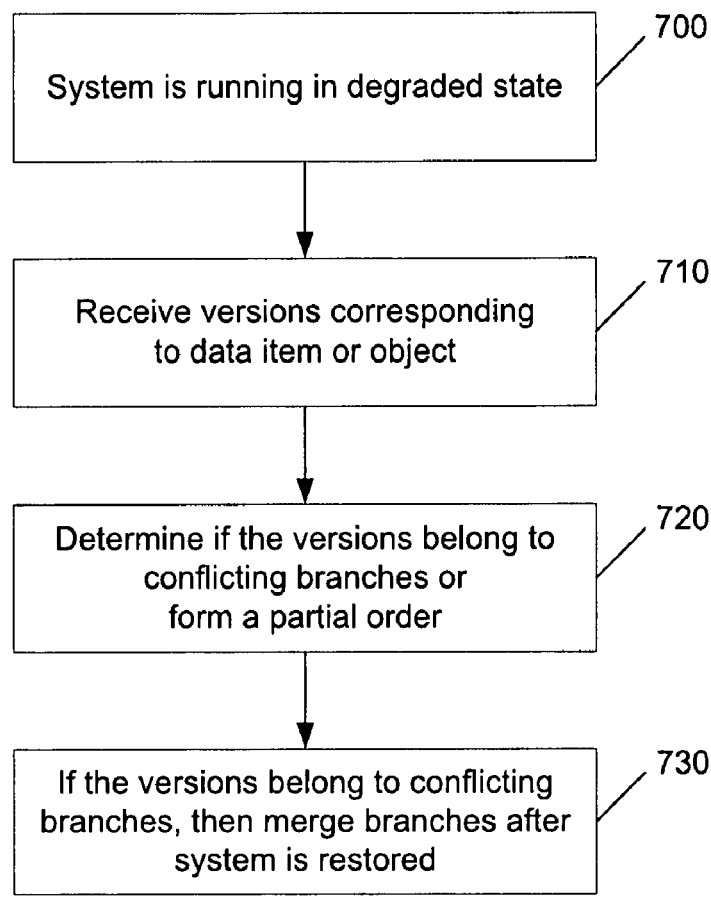
FIG. 9 is a flow diagram of an example branching method.

FIG. 9 is a flow diagram of an example branching method. At step 700, a system is running in a degraded state, such as described above for example. At step 710, versions corresponding to a data item or object are received. It is determined at step 720 if the versions belong to conflicting branches or if they form a partial order. If the versions belong to conflicting branches, then they are merged at step 730 after the system has been restored and is no longer operating in a degraded state.

Figure 10:
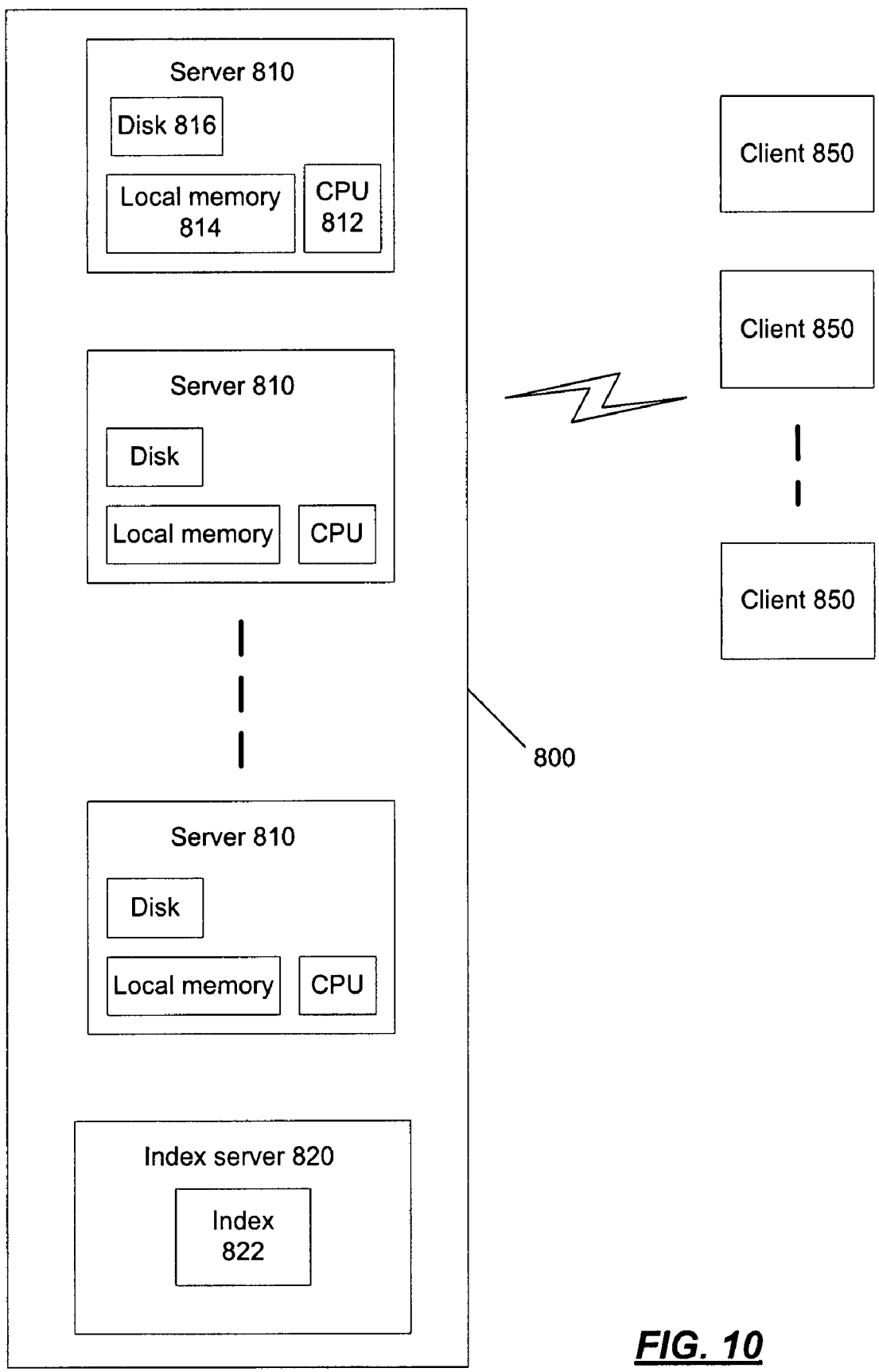
FIG. 10 is a diagram of another example system.

An example system is shown in FIG. 10 and follows a client/server model. A storage service 800 is implemented by a set of logical servers 810 storing object versions. Each logical server 810 might be implemented by a set of physical machines using some fault tolerant mechanisms. Different versions of the same object reside on different logical servers, so that some object version is likely to be available even with massive failures.

In a typical setting, as shown in FIG. 10 for example, the system has a large number of server machines 810 for storage of data items. Each server has one or more CPUs 812, local memory 814, and locally attached disks 816. There are also one or more clients 850 that take client requests and distribute the requests to the servers 810. These machines may be in the same administrative domain, connected through one or multiple high-speed network switches. The servers are often organized into racks with their own shared power supply and network switches.

Client machines 850 interact with the service 800 for storing and retrieving object versions. An example service also allows users to specify the boundary of an atomic operation or a transaction. An atomic operation might involve multiple basic operations within a begin transaction and end transaction construct. Desirably, the objects are fetched from the service to a client in a basic read operation and modified before they are written back to the service in a basic write operation. For each response, the service 800 desirably indicates whether it is degraded or not. The version numbers and the dependency sets may be returned as the metadata for the requested objects and can be inspected by clients 850.

An example service desirably has an index server 820 that maintains an index 822 that keeps track of the information on the available versions for each object and the mapping from object versions to their locations. The index server 820 might be implemented by a set of servers and the set might change over time (e.g., due to failures). For graceful degradation, the system copes with the case where the index server 820 becomes unavailable or the case where the index 822 becomes inaccurate. Both could occur during massive failures or network partitions.

It is desirable for the index server 820 to know whether the index 822 is accurate or not. For example, the index server 820 desirably knows whether the object versions it locates for users are the up-to-date ones in order to inform the users whether the responses are degraded or not.

In a normal state, newly created versions will go through the index server 820. The index server 820 for an object maintains leases from the servers 810 storing some version of that object. When a new version is created from an existing old version, the server storing the old version notifies the index server about the new version. The index service then starts a new lease from the server storing the new version, if such a lease has not been established. If the server is unable to communicate with the index server, the lease eventually expires on the index service. At this point, the index server knows that its metadata might not be accurate anymore.

The index might get lost or outdated. In both cases, the metadata is to be reconstructed. Each server storing object versions also desirably maintains the information about its local inventory. That is, the metadata for each object version is desirably co-located on the same server for fault isolation.

A link structure can be further maintained in a decentralized fashion to aid index reconstruction. When an object version <O,v'> is created from <O,v>, the metadata about <O,v> is desirably stored with <O,v'> and vice versa. This creates a doubly linked structure among different versions of the same object. The index server knows that it has all the information about an object if it manages to find all object versions following the links, without waiting for all servers to be available. This is particularly useful when handling permanent data loss. The link structure can help assess whether a certain object is affected by the loss.

Exemplary Computing Arrangement

Figure 11:
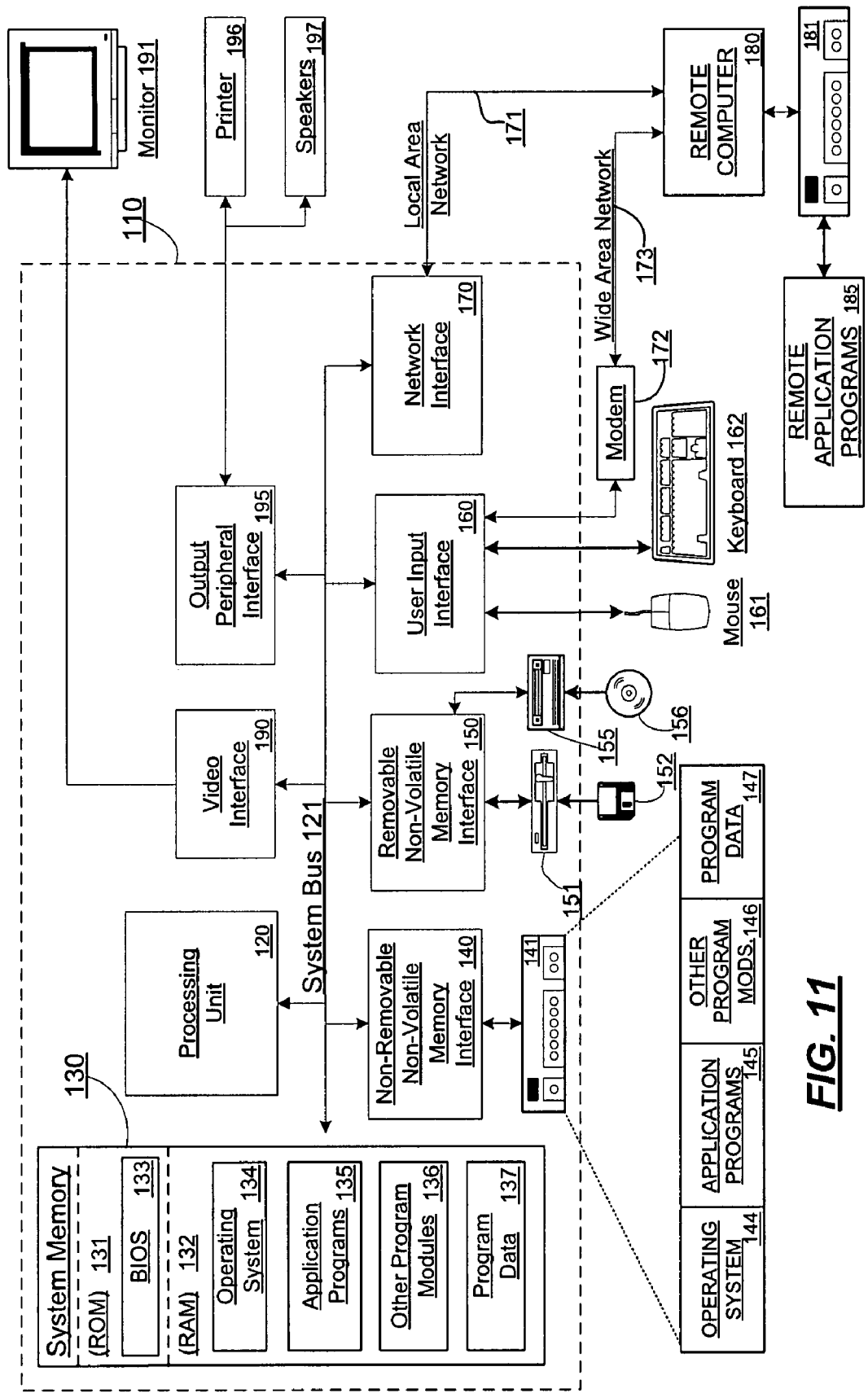
FIG. 11 is a block diagram of an example computing environment in which example embodiments and aspects may be implemented.

FIG. 11 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 11, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 11 illustrates operating system 134, application programs 135, other program modules 136, and program data 137.

The computer 110 may also include other removable/non-removable, volatile/nonvolatile computer storage media. By way of example only, FIG. 11 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 11, provide storage of computer readable instructions, data structures, program modules and other data for the computer 110. In FIG. 11, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 11. The logical connections depicted in FIG. 11 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 11 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for use in a distributed storage system, the method comprising:
   maintaining a plurality of versions of a data item including a latest version and an older version, wherein the plurality of versions of the data item include a plurality of older versions of the data item, each older version being associated with a different time based on storage of that older version of the data item;
   entering a degraded state on the distributed storage system, wherein the degraded state has a degree of degradation based on the version of the data item that is used during processing in the degraded state; and
   if the latest version of the data item is unavailable in the degraded state, then using the older version of the data item during processing in the degraded state.

2. The method of claim 1, wherein entering the degraded state occurs when a number of failures exceeds a threshold.

3. The method of claim 2, further comprising using a fault tolerance mechanism associated with the distributed system to determine when the number of failures exceeds the threshold.

4. The method of claim 1, further comprising storing the versions of the data item prior to entering the degraded state.

5. The method of claim 1, further comprising providing an indication that the processing of the data item in the degraded state is based on the older version of the data item.

6. The method of claim 1, further comprising leaving the degraded state and returning to a normal operating state after the distributed storage system recovers.

7. The method of claim 1, wherein if the latest version of the data item is unavailable in the degraded state, then using the latest available older version of the data item during processing in the degraded state.

8. The method of claim 1, wherein a plurality of consistent degraded views of the distributed storage system is maintained during processing in the degraded state.

9. The method of claim 8, wherein the consistent degraded views are maintained using at least one of a timestamp-based design, a dependency-based design, or a weak-dependency-based design.

10. The method of claim 1, further comprising receiving additional versions of the data item while in the degraded state, branching the additional versions while in the degraded state using a plurality of branches, and merging the branches while in a normal operating state after the distributed storage system recovers.

11. The method of claim 1, wherein maintaining the plurality of versions of the data item comprises storing a timestamp for each version of the data item as metadata.

12. A distributed storage system comprising:
    a versioned data store comprising a plurality of data storage devices across which a plurality of versions of a data item are stored, including a latest version and older versions; and
    a processor that determines whether to enter a degraded state, and during processing in the degraded state, determines whether to use the latest version of the data item or one of the older versions of the data item, wherein the processor provides data for use by an output device to provide an indication to a user or a client that the processing of the data item in the degraded state is based on one of the older versions of the data item.

13. The system of claim 12, further comprising a fault tolerance mechanism, wherein the degraded state is entered when a number of failures in the system exceeds the capability of the fault tolerance mechanism.

14. The system of claim 12, further comprising an index server that maintains an index that tracks the versions of the data item.

15. A method for use in a distributed storage system, the method comprising:
    receiving an update to a version of a data item that is stored on a storage server;
    creating a new version of the data item; and
    storing the new version and a plurality of older versions of the data item with metadata on a different storage server, the metadata is used to maintain consistent degraded views of the distributed storage system during processing in a degraded state, wherein the degraded state has a degree of degradation based on the version of the data item that is used during processing in the degraded state.

16. The method of claim 15, wherein the metadata corresponds to at least one of a timestamp-based design, a dependency-based design, or a weak-dependency-based design.

17. The method of claim 15, further comprising determining whether the version of the data item that is stored on the storage server and the new version are coherent.

18. The system of claim 13, wherein the fault tolerance mechanism determines when the number of failures exceeds the capability of the fault tolerance mechanism.

19. The system of claim 12, wherein the processor leaves the degraded state and returns to a normal operating state after the distributed storage system recovers.

20. The system of claim 12, wherein the versioned data store maintains a plurality of consistent degraded views of the distributed storage system during processing in the degraded state, wherein the consistent degraded views are maintained using at least one of a timestamp-based design, a dependency-based design, or a weak-dependency-based design.

* * * * *